United States Patent
Keranen et al.

(10) Patent No.: US 9,030,290 B2
(45) Date of Patent: May 12, 2015

(54) VICINITY-BASED MULTI-FACTOR AUTHENTICATION

(71) Applicant: Telefonaktiebolaget L M Ericsson (publ), Stockholm (SE)

(72) Inventors: Ari Keranen, Kirkkonummi (FI); Jari Arkko, Kauniainen (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 29 days.

(21) Appl. No.: 13/682,030

(22) Filed: Nov. 20, 2012

(65) Prior Publication Data

US 2014/0139315 A1    May 22, 2014

(30) Foreign Application Priority Data

Nov. 16, 2012   (WO) ................. PCT/EP2012/072837

(51) Int. Cl.
  G05B 19/00    (2006.01)
  G06F 7/04     (2006.01)
  G05B 1/00     (2006.01)
  G07C 9/00     (2006.01)
  H04L 29/06    (2006.01)
  H04W 12/06    (2009.01)

(52) U.S. Cl.
  CPC .............. G05B 1/00 (2013.01); G07C 9/00174 (2013.01); H04L 63/0853 (2013.01); H04W 12/06 (2013.01); H04L 63/0492 (2013.01); H04L 2463/082 (2013.01)

(58) Field of Classification Search
  USPC ............... 340/5.61–5.64, 426.36; 726/14, 20; 380/270
  See application file for complete search history.

(56) References Cited

U.S. PATENT DOCUMENTS

| 5,659,617 A * | 8/1997 | Fischer .......................... 380/258 |
| 6,346,878 B1 * | 2/2002 | Pohlman et al. .............. 340/435 |
| 2002/0141586 A1 * | 10/2002 | Margalit et al. ............... 380/270 |
| 2007/0080824 A1 * | 4/2007 | Chen et al. ............... 340/825.49 |
| 2007/0239615 A1 * | 10/2007 | Matsuzaki et al. .............. 705/55 |
| 2008/0055041 A1 | 3/2008 | Takene et al. |
| 2008/0289030 A1 * | 11/2008 | Poplett .......................... 726/15 |
| 2010/0201482 A1 | 8/2010 | Robertson et al. |

(Continued)

OTHER PUBLICATIONS

Sun, D., et al., "A New Design of Wearable Token System for Mobile Device Security", IEEE Transactions on Consumer Electronics, IEEE, Service Center, New York, NY, US, vol. 54, No. 4, Nov. 1, 2008, pp. 1784-1789, XP011239747.

(Continued)

*Primary Examiner* — Van Trieu
*Assistant Examiner* — Royit Yu
(74) *Attorney, Agent, or Firm* — Rothwell, Figg, Ernst & Manbeck, P.C.

(57) ABSTRACT

The invention relates to a wireless device, configured for ensuring authentication of a user, to a reference unit configured for ensuring authentication of a user of the wireless device and to a method for ensuring authentication of a user. The wireless device comprises a checking unit configured for scanning a distance to a reference unit and for checking if the distance scanned lies within a predetermined range such that authentication of the user is ensured. In this way, a wireless device is provided which is simple and cost-effective to realize and increases security by making sure that the rightful owner is available without the need of asking for PIN codes, passwords or other measures, such as biometric recognition, i.e. voice recognition, fingerprint recognition, retina recognition and the like.

15 Claims, 3 Drawing Sheets

(56) References Cited

U.S. PATENT DOCUMENTS

| | | | |
|---|---|---|---|
| 2011/0090043 A1* | 4/2011 | Tseng | 340/5.7 |
| 2011/0214158 A1* | 9/2011 | Pasquero et al. | 726/2 |
| 2011/0314539 A1* | 12/2011 | Horton | 726/20 |
| 2013/0022198 A1* | 1/2013 | Willey | 380/255 |
| 2013/0244615 A1* | 9/2013 | Miller | 455/411 |

OTHER PUBLICATIONS

Jansen, W. "Authenticating Users on Handheld Devices", Proceedings of the Canadian Information Technology Security Symposium, May 2003, May 1, 2003, pp. 1-12, XP001556178.

Jansen, W. et al., "Proximity Beacons and Mobile Device Authentication: An Overview and Implementation", National Institute of Standards and Technology, Jun. 1, 2005, 36 pages, XP08116239.

Akram, H., et al., "Laws of Identity in Ambient Environments: The HYDRA Approach", Mobile Ubiquitous Computing, Systems, Services and Technologies, 2008, UBICOMM '08, The Second International Conference on, IEEE, Piscataway, NJ, USA, Sep. 29, 2008, pp. 367-373, XP031345722.

International Search Report and Written Opinion issued on Aug. 20, 2013 in International application No. PCT/EP2012/072837, 10 pages.

\* cited by examiner

VICINITY-BASED MULTI-FACTOR AUTHENTICATION

This application claims priority to international patent application no. PCT/EP2012/072837, filed 16 Nov. 2012, which is incorporated by reference herein in its entirety.

TECHNICAL FIELD

The invention relates to a wireless device, configured for ensuring authentication of a user.

BACKGROUND

Wireless devices, such as Smartphones, are more and more replacing various other daily items individual persons carry along with them ranging from credit cards to home keys. Typically a home door is opened or an item is bought from a shop by swiping a mobile device, such as a phone, next to a receiver and optionally inserting a PIN code or a password on the phone. If the Smartphone is stolen or lost somewhere, anyone finding it could make payments or open doors on behalf of the rightful owner. Instead of having merely the possession of the Smartphone some form of extra security is required for authenticating the correct user. Usually a simple solution is to use a PIN code or a password on the device every time it is used but this is rather tedious since it requires user interaction and additionally remembering passwords or PIN codes, respectively. Further, a bystander may see the password or recognize the PIN code and if he or she steals the phone, he or she could have access to everything that is authenticated with the phone and the password.

SUMMARY

It is the object of the invention to provide a possibility for authenticating a user with increased security which should be simple and cost-effective to realize while at the same time avoids using passwords, PIN codes or other measures, such as biometric recognition, for instance voice recognition, fingerprint recognition or retina recognition.

This object is achieved by the subject matter of the independent claims. Preferred embodiments are defined in the sub claims.

According to a first aspect of the invention, this object is achieved by a wireless device, configured for ensuring authentication of a user, comprising a checking unit configured for scanning a distance to a reference unit and for checking if the distance scanned lies within a predetermined range such that authentication of the user is ensured.

It is an idea of the invention to carry out a proximity measurement between two units, such as between a checking unit of the wireless device and a reference unit which is not part of the wireless device. The idea is based on the fact that two separate units are most likely not stolen or not lost at the same time. Thereafter, the measurement result is analyzed in order to check if authentication of the user should be approved. The wireless device preferably corresponds to a Smartphone or to a mobile device, such as a cell phone, or to any other equipment, such as a wristwatch or jewellery. The checking is preferably done by using radio techniques such as radio-frequency identification, RFID for short, in near field communication, NFC for short, applications, Bluetooth, ZigBee or similar technologies. The term "scanning a distance" means that a distance between the two units is measured, wherein the measurement can be performed in different ways. Preferably the measurement is done in certain predefined time intervals which repeat themselves in equidistant or non-equidistant steps or the measurement is performed constantly. It is also possible that the measurement is performed once during a predefined time period dependent on an action of a user.

According to a preferred embodiment of the invention, the checking unit is further configured for running a cryptographic challenge-response protocol which requests the reference unit to prove its identity using a shared secret cryptography and/or a public key cryptography while scanning the distance to the reference unit such that it is ensured that the wireless device and the reference unit are assigned to each other. The wireless device is thus reliable since the reference unit preferably signs a portion of data provided by the checking unit using a private key or a shared secret cryptography. The reference unit preferably proves by signing with its private key that it is the legitimate holder of the public key identity. Preferably, the cryptographic challenge-response protocol requests a public key identity of the reference unit and the public key identity of the reference unit matches the public key identity stored at the checking unit. With the matching it is preferably ensured that no attacker can pretend to be the reference unit since it is checked that the device with the right identification, ID for short, is present, for instance by additionally asking for a PIN code or for a password or by scanning an object which is in close proximity to identify predefined spatial features of the object.

According to a preferred embodiment of the invention, the predetermined range is selected by pairing the checking unit with the reference unit in such a way that the checking unit requests the position of the reference unit before calculating the distance between the reference unit and the checking unit. The term "position" refers to an "absolute position" but can also refer to a "relative position" dependent on the actual context or situation. Such a pairing can also be used in Bluetooth applications, also called Bluetooth pairing, and works in a first step with teaching, for instance, a phone that a headset is associated with it and, in a second step, the headset is taught that the phone is bonded to it.

According to a preferred embodiment of the invention, the predetermined range is adjusted by varying the radio power level at the checking unit and measuring the position of the reference unit such that the distance between the reference unit and the checking unit is extracted and compared with predetermined reference data. The predetermined reference data preferably comprises the predetermined range and is preset by previous measurements and/or preset to a range which is based on empiric values. An actual measurement may change the predetermined range such that it is adjusted to a different range fitting to the actual measurement result.

According to a preferred embodiment of the invention, the checking unit is further configured for detecting that at least one security unit is arranged within the predetermined range to the reference unit. Hence, there is no need for using passwords while at the same time security is increased so that the wireless device is able to check that a plurality of additional security devices, ASDs for short, are arranged in its vicinity to make sure that the wireless device is still with its rightful owner. By increasing the number of ASDs security can still be increased. The wireless device preferably uses short range radio and contacts the ASDs. Based on their capabilities the wireless device preferably checks that the plurality of ASDs is in close proximity to a reference unit or the wireless device performs a cryptographic challenge-response protocol to make sure that there is no attacker pretending as one of the ASDs. The ASDs are preferably integrated into other items that the user is carrying along anyway, such as into a wristwatch or into jewellery, or the ASD is a separate device, such as a key fob or a key chain. Preferably, the at least one security unit is configured for sending a command to an application unit which is configured for running a program ensuring authentication of the user, wherein the application unit is integrated into the wireless device. When the distance between the reference unit and the checking unit or the distance between the reference unit and the at least one security unit lies outside the predetermined range such that authentication of the user fails, the checking unit is preferably further configured for requesting a password and/or a PIN code from the user and/or for performing biometric recognition, such as voice recognition, fingerprint recognition and/or retina recognition. This way, these additional measures can further increase reliability and security. The voice recognition is preferably carried out by recording the voice of the user and comparing it with recorded data stored on the wireless device or in a database on a server.

According to a preferred embodiment of the invention, the at least one security unit is integrated into the wireless device. Therefore, the wireless device can be built very compact.

According to another preferred embodiment of the invention, the at least one security unit is integrated into a wristwatch, into jewellery, into clothing, into luggage, into a laptop, into a key fob or into a key chain. Hence, it is an idea of the invention that the security unit is positionable anywhere outside the wireless device and thus security further increases.

According to a second aspect of the invention, above mentioned object is achieved by a reference unit configured for ensuring authentication of a user of the wireless device according to the first aspect of the invention, wherein the reference unit is integrated into clothing, such as a hat, a shirt or underwear. Hence, the reference unit is not only allowed to be arranged at a fixed position but can also be carried along with the user.

According to a third aspect of the invention, above mentioned object is achieved by a method for ensuring authentication of a user comprising the steps of: a) scanning a distance to a reference unit and b) checking if the distance scanned in step a) lies within a predetermined range such that authentication of the user is ensured.

According to a preferred embodiment of the invention, the method further comprises the step of detecting that at least one security unit is arranged within the predetermined range to the reference unit. The method preferably further comprises the step of sending a command to an application unit which is configured for running a program ensuring authentication of the user.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION

Figure 1:
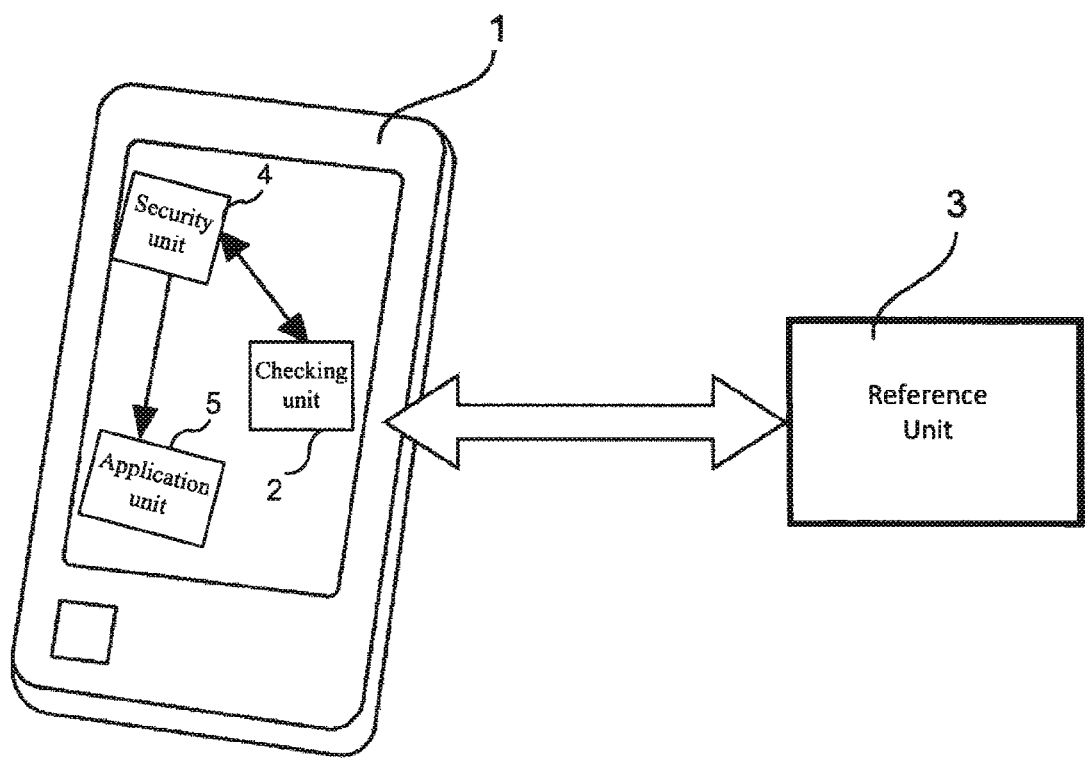
FIG. 1 shows a wireless device according to a first preferred embodiment of the invention.

FIG. 1 shows a wireless device configured for ensuring authentication of a user according to a first preferred embodiment of the invention. The wireless device 1 comprises a checking unit 2 which scans a distance to a reference unit 3 which is not part of the wireless device 1. Furthermore, the checking unit 2 checks if the distance measured lies within a predetermined range such that authentication of the user is ensured. The predetermined range is set to an empirical value in this first preferred embodiment. The checking unit 2 measures a distance to the reference unit 3 which lies outside the wireless device 1 and compares the result with previous measurement results stored in a database in this first preferred embodiment. According to this first preferred embodiment of the invention the reference unit 3 corresponds to a passive RFID chip which does not need any battery and is arranged at a fixed position on a ground. According to other preferred embodiments of the invention, the reference unit 3 is integrated into underwear. Furthermore, the checking unit 2 detects one security unit 4 that is arranged within the predetermined range to the reference unit 3. This way it is guaranteed that the measurement results are verified which increases security. The security unit 4 sends a command to an application unit 5 which runs a program and is integrated into the wireless device 1. The application serves for opening a door in this first preferred embodiment of the invention.

Figure 2:
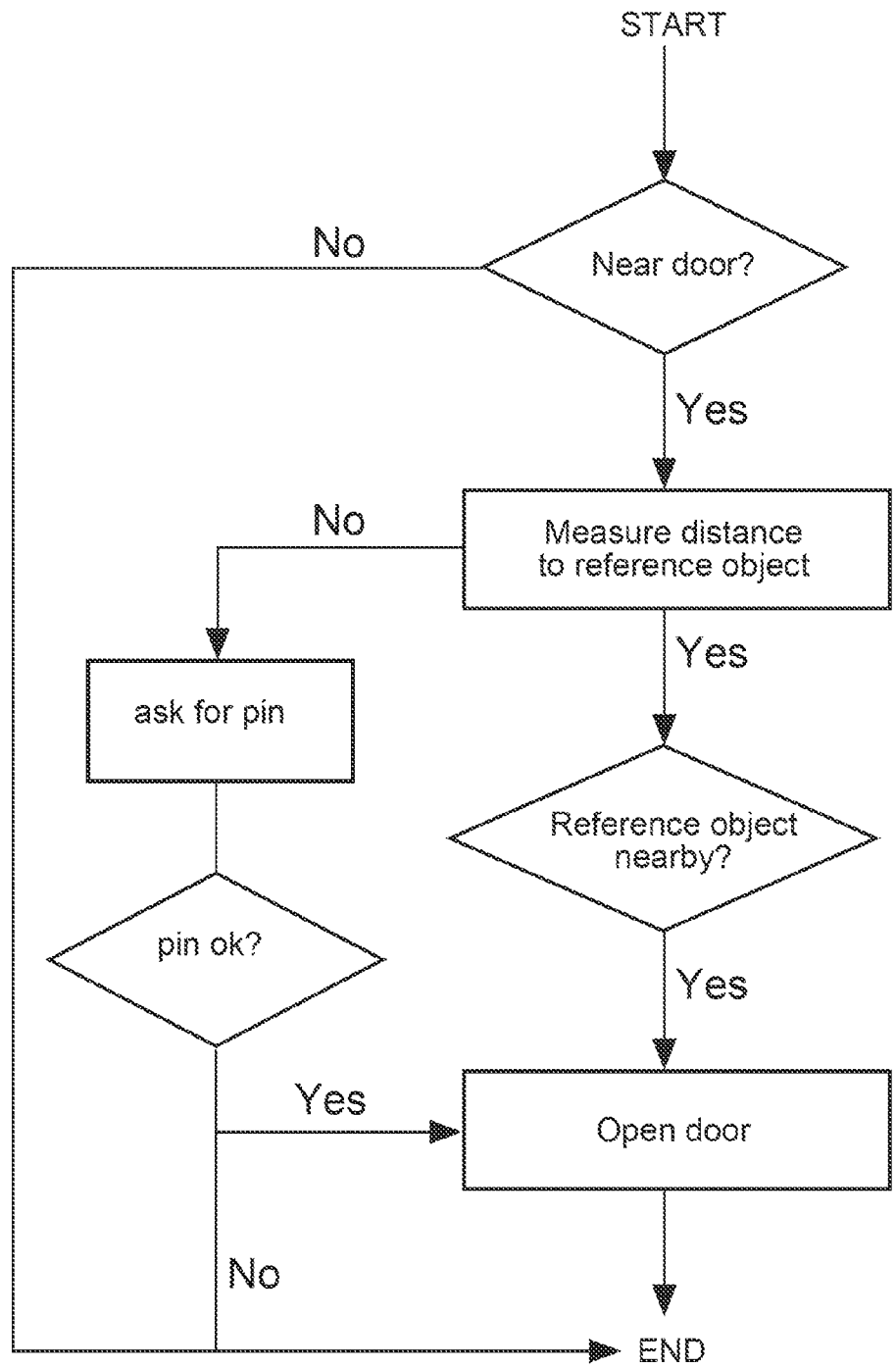
FIG. 2 illustrates the steps of a method for ensuring authentication of a user according to a second preferred embodiment of the invention.

FIG. 2 schematically shows a method for ensuring authentication of a user according to a second preferred embodiment of the invention. Initially, i.e. before a predetermined action, such as walking to a door and opening the door is performed, a Smartphone is paired with a headset and a key is exchanged. Afterwards, a proximity measurement between the checking unit 2 and the reference unit 3 as in the first preferred embodiment is performed and based on the result of this step the door is opened or it is refused to be opened. Basically, it is checked if the user is near the door. If yes, the distance to the reference object 3 is measured. If the reference object 3 is nearby, the door is opened and the method reaches its end. If the door is not nearby the method can also reach its end. Alternatively, if the distance to the reference object cannot be measured regardless for whatever reason, a PIN code is asked for and if the PIN code is verified, then the door is opened. Otherwise the method also reaches its end. Hence, security for Smartphone-based transactions and authorization is increased. Many wireless devices, such as Smartphones, already have various short range radios and it is thus simple to re-use them. Further, a dynamic security level is adjustable, i.e. if required after detecting a number of ASDs it is further asked for a pin code, for a password and/or voice recognition or similar measures are performed.

Figure 3:
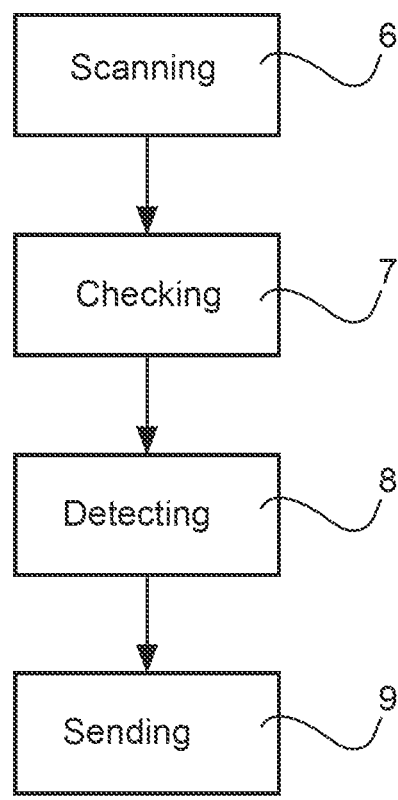
FIG. 3 schematically illustrates the steps of the method according to the second preferred embodiment of the invention.

FIG. 3 schematically illustrates the steps of the method according to the second preferred embodiment of the invention. In a first step, the distance to a reference unit is scanned 6. Thereafter, in the checking step 7 it is controlled whether the distance scanned in the first step 6 lies within a predetermined range. In further steps, it is detected 8 that at least the one security unit is arranged within the predetermined range to the reference unit. Finally, a command is sent 9 to an application unit which is configured for running a program ensuring authentication of the user. In its simplest form, one application and one Bluetooth device is used.

While the invention has been illustrated and described in detail in the drawings and foregoing description, such illustration and description are to be considered illustrative or exemplarily and not restrictive; the invention is not limited to the disclosed embodiments.

Other variations to the disclosed embodiments can be understood and affected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that the combination of these measures cannot be used to advantage. Any reference signs in the claims should not be construed as limiting the scope.

The invention claimed is:

1. A wireless device, configured for ensuring authentication of a user, comprising:
    a processor for detecting that the wireless device is within the proximity of an object with which the device may interact; and
    a scanner for scanning a distance from the wireless device to a reference unit in response to the processor detecting that the wireless device is within the proximity of the object with which the device may interact, wherein
    the processor is configured to determine whether the distance scanned lies within a predetermined range such that authentication of the user is ensured, and
    the object is separate and distinct from the reference unit.

2. The wireless device according to claim 1, wherein the processor is further configured for running a cryptographic challenge-response protocol which requests the reference unit to prove its identity using a shared secret cryptography and/or a public key cryptography while employing the scanner to scan the distance to the reference unit such that it is ensured that the wireless device and the reference unit are assigned to each other.

3. The wireless device according to claim 2, wherein the cryptographic challenge-response protocol requests a public key identity of the reference unit and the public key identity of the reference unit matches the public key identity stored at the wireless device.

4. The wireless device according to claim 1, wherein the predetermined range is selected by pairing the wireless device with the reference unit in such a way that the processor requests the position of the reference unit before calculating the distance between the reference unit and the wireless device.

5. The wireless device according to claim 1, wherein the predetermined range is adjusted by varying a radio power level and measuring the position of the reference unit such that the distance between the reference unit and the wireless device is extracted and compared with predetermined reference data.

6. The wireless device according to claim 1, wherein the processor is further configured for detecting that at least one security unit is arranged within the predetermined range to the reference unit.

7. The wireless device according to claim 6, wherein the wireless device comprises an application unit, and the at least one security unit is configured for sending a command to the application unit which is configured for running a program ensuring authentication of the user.

8. The wireless device according to claim 6, wherein when the distance between the reference unit and the wireless device or the distance between the reference unit and the at least one security unit lies outside the predetermined range such that authentication of the user fails, the processor is further configured for requesting a password and/or a PIN code from the user and/or for performing biometric recognition.

9. The wireless device according to claim 6, wherein the at least one security unit is integrated into the wireless device.

10. The wireless device according to claim 6, wherein the at least one security unit is integrated into a wristwatch, into jewelry, into clothing, into luggage, into a laptop, into a key fob or into a key chain.

11. A reference unit configured for ensuring authentication of a user of a wireless device according to claim 1, wherein the reference unit is integrated into clothing.

12. A method for ensuring authentication of a user, comprising the steps of:
    a) determining, by one or more processors within the wireless device, that the wireless device is within the proximity of an object with which the device may interact;
    b) in response to determining that the wireless device is within the proximity of the object, scanning a distance from the wireless device to a reference unit; and
    c) checking if the distance scanned in step b) lies within a predetermined range such that authentication of the user is ensured, wherein
    the object is separate and distinct from the reference unit.

13. The method according to claim 12, further comprising the step of detecting that at least one security unit is arranged within the predetermined range to the reference unit.

14. The method according to claim 13, further comprising the step of sending a command to an application unit which is configured for running a program ensuring authentication of the user.

15. The method of claim 12, wherein
    the object is a door, and
    the method further comprises the wireless device opening the door in response to the wireless device determining that the distance scanned in step (b) lies within the predetermined range.

* * * * *